Oct. 12, 1965
P. CADOVIUS
3,211,481
FRAME WORK COMPRISING TUBULAR ELEMENTS AND CONNECTING
DEVICES AND TUBULAR ELEMENTS AND DEVICES
FOR USE IN ASSEMBLING A FRAME WORK
Filed April 2, 1964
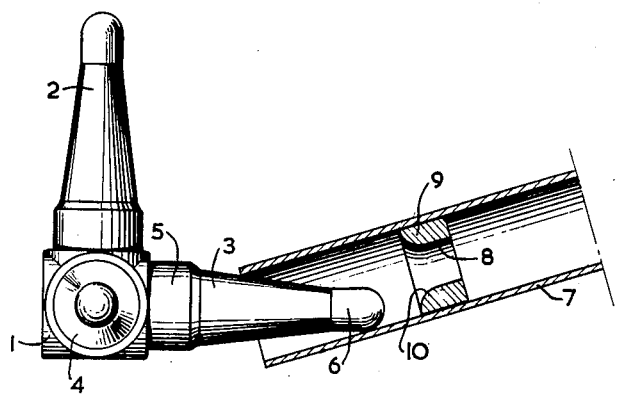
INVENTOR
POUL CADOVIUS
BY Stevens, Davis, Miller & Mosher
ATTORNEY United States Patent Office 3,211,481
Patented Oct. 12, 1965

3,211,481
FRAME WORK COMPRISING TUBULAR ELEMENTS AND CONNECTING DEVICES AND TUBULAR ELEMENTS AND DEVICES FOR USE IN ASSEMBLING A FRAME WORK
Poul Cadovius, Ildervej, Skaade Bakker port on Hojbjerg, Denmark
Filed Apr. 2, 1964, Ser. No. 356,855
Claims priority, application Denmark, Apr. 5, 1963, 1,614/63
4 Claims. (Cl. 287—54)

This invention relates to a framework comprising tubular elements and devices having at least one spigot, pin or the like over which a tubular element can be slid in spigot and socket fashion. The term "tubular element" is intended to include any member which is tubular at least at one end.

In the specification of Danish Patent 94,025 is disclosed a device for use in assembling frameworks of tubu-elements, said device having at least one spigot over which a tube may be slid, and a waisted intermediate portion formed so as to enable a tubular element to be engaged over said outer portion even though said tubular element is significantly out of alignment with said spigot.

This construction affords special advantages which will especially appear during assembling. It is the object of the present invention to provide a framework having simular advantages but providing also a reinforcement of a particularly exposed place in the framework. Such place is the place in the tubular element where the outer end of the pin contacts the tubular element. Especially in frameworks of large dimensions, it may be necessary to use a heavy excess thickness in order to obtain sufficient strength around this place. According to the invention the framework and the device is so arranged that the spigot, in the part over which the tubular element is first slid has smaller cross-sectional dimensions than the internal cross-sectional dimensions of the tubular element, said tubular element having in the place where the end of the spigot is located when the tube has been pushed all the way in over the spigot and with its end engages a fitting surface on the spigot, a smaller cross-sectional dimension corresponding to the end of the spigot. By this structure it is obtained that the tubular element and the spigot can be assembled while their axes are significantly out of alignment, the tubular element and the spigot adopting a co-axial position when entirely connected. Provided that the outer dimensions of the tubular element is constant there is at the place where the fitted surface inside the tubular element is located, provided a reinforcement, and the thickness of the walls of the tubular element may therefore be chosen independently of the requirements to strength at the said place in the tubular element.

According to the invention the tubular element may have an internal bushing having an internal fitting surface with which the fitting surface located in the front of a spigot to be pushed into the tubular element may enter into engagement. When the tubular element and the spigot are entirely connected, the end of the tubular element engages a corresponding fitting surface on the spigot. This fitting surface has substantially the same cross-sectional dimension as the internal cross-sectional dimension of the tubular element.

It is characteristic for an assembling joint according to the present invention that the spigot have two fitting surfaces of mutually different cross-sectional dimensions and so spaced apart that the fitting surface having the smallest cross-sectional dimension is closest to the end of the spigot over which a tube is slid first.

The invention will be explained in detail below with reference to the embodiment shown in the accompanying drawing which illustrates a device for use in assembling a framework and the end of a tubular rod which has been slid half way over a spigot of a connecting device. The parts here concerned constitute parts of a framwork according to the invention, which framework may be constructed of any number of tubular rods and any number of connecting devices.

In the drawing, 1 is the base portion of a connecting device having three spigots 2, 3, and 4. Each of the spigots is provided with two fitting surfaces which on the spigot 3 are designated 5 and 6, respectively, 5 being the fitting surface which lies closest to the base portion 1, i.e. at the root of the spigot, whilst 6 is the fitting surface at the end of the spigot, namely the end over which a tube is first slid when assembling a framework. The two fitting surfaces 5 and 6 have different cross-sectional dimensions. The fitting surface 5 has a cross-sectional dimension which corresponds to the internal dimension of a tube 7 which is shown in cross section. The tube 7 has been slid a little way in over the spigot 3 and it will be seen from the drawing that the axis of the tube can form an angle with that of the spigot, and that this angle is greater than it would be if the outer fitting surface 6 of the spigot had the same cross-sectional dimension as the fitting surface 5. The fitting surface 6 is to engage a fitting surface 8 on a bushing or internal collar 9 inserted in the tube, said bushing having a guiding surface 10 which guides the end of the spigot 3 into the interor of the bushing 9 when the tubular element and the spigot are pushed further together from the position shown in the drawing, so that the fitting surface 6 of the spigot 3 will engage the fitting surface 8 of the lining 9. In this position the spigot and the tubular element will be coaxial.

The framework including a tubular element having locally increased thickness affords the advantage that in a simple manner a locking mechanism can be provided which in its simplest form may be constituted of a pointed screw which is disposed in a radial threaded hole in the thickened place. If the thickness is provided by a bushing or ring being inserted and jammed in the interior of the tube, the locking mechanism may be located in the ring proper. If the locking mechanism is to be operable from the outside, such as it is the case if it is constituted by a pointed screw, a hole must be provided in the wall of the tubular element so that a screw driver can be inserted into the slot of the pointed screw. If the locking is only to be of a lighter nature, the bushing or ring may be provided with a ball lock which engages a circumferential groove or a recess in the fit surface 6 of the spigot 3.

The two fitting surfaces 5 and 6 need not be circular-cylindrical. The tube 7 may have any suitable cross-sectional shapes. Even if the tube 7 is circular-cylindrical, and the fitting surface 5 of the spigot 3, therefore, also circular-cylindrical, the fitting surface 6 and the fitting surface 8 may in cross section be polygonal. In this case a turning of the tube will, subsequently to its having been slid all the way in over the spigot, be prevented.

The bushing 9 may be fastened to the tube 7 in any suitable manner, for example by jamming, welding, inserting a pin or a screw etc.

The locking mechanism which is to lock the bushing and the spigot together, may for instance comprise a locking member which engages the tube as well as the bushing. The locking member may, if desired, extend quite through the spigot, for example so that at either end it engages the bushing.

I claim:

1. In a framework comprising at least two tubular members, a connecting device for connecting said tubular members, said device comprising a base, at least two elongated members extending therefrom each having one sized cylinder adjacent the base and a smaller sized cylinder space therefrom, means smaller than said first sized cylinder joining the two cylinders, and means in the end of each said tubular members complementary to said cylinders.

2. The device of claim 1 wherein said joining means is of a substantially uniform taper.

3. A device for connecting tubular members comprising a base, at least one elongated member extending therefrom and having one size cylinder adjacent the base and adapted to be telescopingly engaged by a portion of an adjacent tubular member, a smaller sized cylinder spaced therefrom and adapted to be quick detachably engaged within an internal bushing within said tubular member, and means smaller than said first sized cylinder joining the two cylinders.

4. The device of claim 3 wherein said joining means is of a substantially uniform taper.

References Cited by the Examiner

UNITED STATES PATENTS

| | | | |
|---|---|---|---|
| 2,588,901 | 3/52 | Weikart | 287—2 |
| 2,653,840 | 9/53 | Bitzer et al. | 287—126 |
| 2,699,182 | 1/55 | Baldridge | 287—2 X |
| 3,008,741 | 11/61 | MacCormack. | |

FOREIGN PATENTS 94,024　7/62　Denmark.

M. CARY NELSON, *Primary Examiner.*

HENRY T. KLINKSIEK, *Examiner.*